US012809578B2

(12) United States Patent
Dalzell et al.

(10) Patent No.: US 12,809,578 B2
(45) Date of Patent: Nov. 24, 2026

(54) METHODS AND SYSTEMS FOR INDIVIDUALIZED, LOCATION-BASED, TIME-CORRECTED AUDIO BROADCASTING AND RECEPTION

(71) Applicant: Dasara Labs, Inc., Providence, RI (US)

(72) Inventors: David Dalzell, Providence, RI (US); Francesco Fraioli, Providence, RI (US)

( * ) Notice: Subject to any disclaimer, the term of this patent is extended or adjusted under 35 U.S.C. 154(b) by 0 days.

(21) Appl. No.: 19/286,379

(22) Filed: Jul. 31, 2025

(65) Prior Publication Data

US 2026/0037212 A1 Feb. 5, 2026

Related U.S. Application Data

(60) Provisional application No. 63/678,215, filed on Aug. 1, 2024.

(51) Int. Cl.

| | |
|---|---|
| ***H04S 7/00*** | (2006.01) |
| ***G06F 3/16*** | (2006.01) |
| ***H04R 1/10*** | (2006.01) |
| ***H04R 29/00*** | (2006.01) |

(52) U.S. Cl.

CPC ........... *G06F 3/165* (2013.01); *H04R 1/1041* (2013.01); *H04R 29/001* (2013.01); *H04S 7/303* (2013.01); *H04R 2460/07* (2013.01)

(58) Field of Classification Search

CPC . H04R 5/033; H04R 5/04; H04R 3/12; H04R 27/00; H04R 1/1041; H04R 29/001; H04R 2460/07; H04S 7/303; H04S 7/304

See application file for complete search history.

(56) References Cited

U.S. PATENT DOCUMENTS

| | | | | |
|---|---|---|---|---|
| 5,619,582 | A * | 4/1997 | Oltman | H04S 1/007 381/79 |
| 9,794,720 | B1 | 10/2017 | Kadri | |
| 10,492,042 | B2 * | 11/2019 | Clemente | G01S 19/10 |
| 11,368,828 | B2 * | 6/2022 | Son | H04W 4/48 |
| 11,716,569 | B2 * | 8/2023 | Shin | H04R 5/02 381/17 |
| 11,951,988 | B2 * | 4/2024 | Suzuki | G05D 1/0272 |
| 2018/0238994 | A1 | 8/2018 | Da Silva Freitas | |
| 2022/0303682 | A1 * | 9/2022 | Bonde | H04R 27/00 |

(Continued)

OTHER PUBLICATIONS

International Search Report and Written Opinion issued in App. No. PCT/US2025/039997, dated Nov. 27, 2025, 9 pages.

*Primary Examiner* — Disler Paul

(74) *Attorney, Agent, or Firm* — Blueshift IP, LLC; Cynthia M. Gilbert

(57) ABSTRACT

A method for using an individualized endpoint location of a user to modify an audio signal includes determining a position of a user listening to a sound, based on an output from a GPS component. The method includes determining a distance of the user from a source of the sound. The method includes determining a corrected speed of sound when accounting for at least one environmental factor of an area associated with the source of the sound. The method includes determining a delay between the position and the source of the sound responsive to the determined position, distance, and corrected speed of sound. The method includes modifying an audio signal generated at the source of the sound, wherein modifying includes applying the determined delay to the audio signal.

18 Claims, 16 Drawing Sheets

(56) References Cited

U.S. PATENT DOCUMENTS

| | | | | |
|---|---|---|---|---|
| 2022/0390580 | A1 | 12/2022 | Bonde | |
| 2024/0056758 | A1 | 2/2024 | Kronlachner | |
| 2024/0064484 | A1 | 2/2024 | Helm | |
| 2024/0284137 | A1* | 8/2024 | Messingher Lang | H04S 7/303 |
| 2024/0297629 | A1* | 9/2024 | Kim | H04S 7/307 |

* cited by examiner

100

METHODS AND SYSTEMS FOR INDIVIDUALIZED, LOCATION-BASED, TIME-CORRECTED AUDIO BROADCASTING AND RECEPTION

CROSS-REFERENCE TO RELATED APPLICATIONS

This application claims priority to U.S. Provisional Patent Application Ser. No. 63/678,215, filed on Aug. 1, 2024, entitled, "Methods and Systems for Individualized, Location-Based, Time-Corrected Audio Broadcasting and Reception," which is hereby incorporated by reference.

BACKGROUND

The disclosure relates to methods for correcting broadcast sound. More particularly, the methods and systems described herein relate to functionality for individualized, location-based, time-corrected audio broadcasting and reception.

The ability to hear a musical performance deeply and clearly diminishes with distance from the source because air, the atmosphere itself, is a poor medium for sound transmission. The further one is from the source of music or the spoken word, the less clear and intelligible the details and nuances become. As an example, headphones place the source within an inch or so of the ear via headphones or earbuds and can provide the clearest audio. Conversely, the intelligibility of sound in general is degraded, and often defeated, by the atmosphere and the distance between source and listener.

There are important trade-offs between headphones/earbuds and large format sound systems. Headphones can deliver high quality sound, but they can also create a sense of isolation from the physical environment. While that may be a benefit if, for example, one is surrounded by unwanted sound, it is a detriment at events such as concerts or sporting events where social connections with fellow concert goers or sports fans are important and can deepen the experience of being among other participants in the listening experience. Large sound systems at concerts and sporting events can deliver a powerful, visceral, listening experience felt by the entire human body, which is a sensation that headphones or earbuds cannot match. However, as indicated above, the experience diminishes with the distance from the source, which is nearly guaranteed at large events where the number of participants is such that it is not physically possible for all participants to be located at an ideal listening distance from the source. Even for those participants who are located at such an ideal listening distance for the majority of the event, should they wish to move about during the event (e.g., to mingle with other participants or to purchase concessions), they would lose the benefits of their location during that time.

There have been attempts to combine near-field technology, such as headphones and earbuds, with delayed loudspeaker arrays or loudspeaker sound towers placed out in the audience to solve the intelligibility questions at large-scale events. However, conventional approaches typically fall short relative to the minute details of the sound, including for example, the ability to easily discern song lyrics or the precise details of the spoken word. Although there are improvements in individual devices such as headphones or assistive listening devices, such devices do not include functionality for modifying via time delay an audio signal where the time delay is determined based on a changeable user position relative to a source of an audio signal.

Therefore, there is a need for technology that can correct broadcast audio by modifying a time of broadcast based on a changeable user position.

BRIEF SUMMARY

In one aspect, a method for using an individualized endpoint location of a user to determine a distance from a source of an audio signal and modifying the audio signal to include a delay includes determining a position of a user listening to a sound, based on an output from a GPS component. The method includes determining a distance of the user from a source of the sound. The method includes determining a corrected speed of sound when accounting for at least one environmental factor of an area associated with the source of the sound. The method includes determining a delay between the position and the source of the sound responsive to the determined position, distance, and corrected speed of sound. The method includes modifying an audio signal generated at the source of the sound, wherein modifying includes applying the determined delay to the audio signal.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein relate to functionality for individualized, location-based, time-corrected audio broadcasting and reception. The audio broadcasting may be a broadcast of audible sounds heard during live events, including, without limitation, concerts, sporting events, performances and so on. The functionality may include individualized, location-based, time-corrected audio broadcasting blended with the sound waves arriving acoustically—through the air—from a source of the sound waves. The methods and systems described herein may provide functionality that combines the impact and power of a large sound system with the precision of headphones or earbuds synchronized with the airborne sound arriving from the stage and may further provide users with a controllable and customizable experience. The methods and systems described herein may provide functionality for supplementing large sound systems with headphones/earbuds modified to be powered by novel, non-obvious software tools. By leveraging technology platforms such as, without limitation, Auracast, LoRa, Ultra Wideband and others, the functionality of these technologies are blended in unique ways to form the basis of unique technical and user-experience (UX) designs.

In some embodiments, methods and systems described herein may provide technology that combines both near-field and far-field platforms, with the nexus being within and at a position of an individual listener, and that modifies the broadcast of the audio to the individual listener.

The methods and systems described herein may include functionality for uniting and synchronizing the airborne sound generated on stage—which may be reinforced by sound systems—with the digital mix of that sound arriving wirelessly at a user's smartphone or other personal computing device from the stage or front-of-house mixing position. The sound of a board mix may be blended with the airborne sound from powerful sound systems by the system to within a time frame such as, without limitation, 30 ms—the threshold of human perception of audio delay—resulting in an improvement to technology for broadcasting audio signals. The methods and systems described herein may also minimize the challenges that arise in problematic and highly reverberant acoustical environments while increasing protection for human hearing by delivering high-definition sound via earbud, headphones, or other transducers.

Figure 1A:
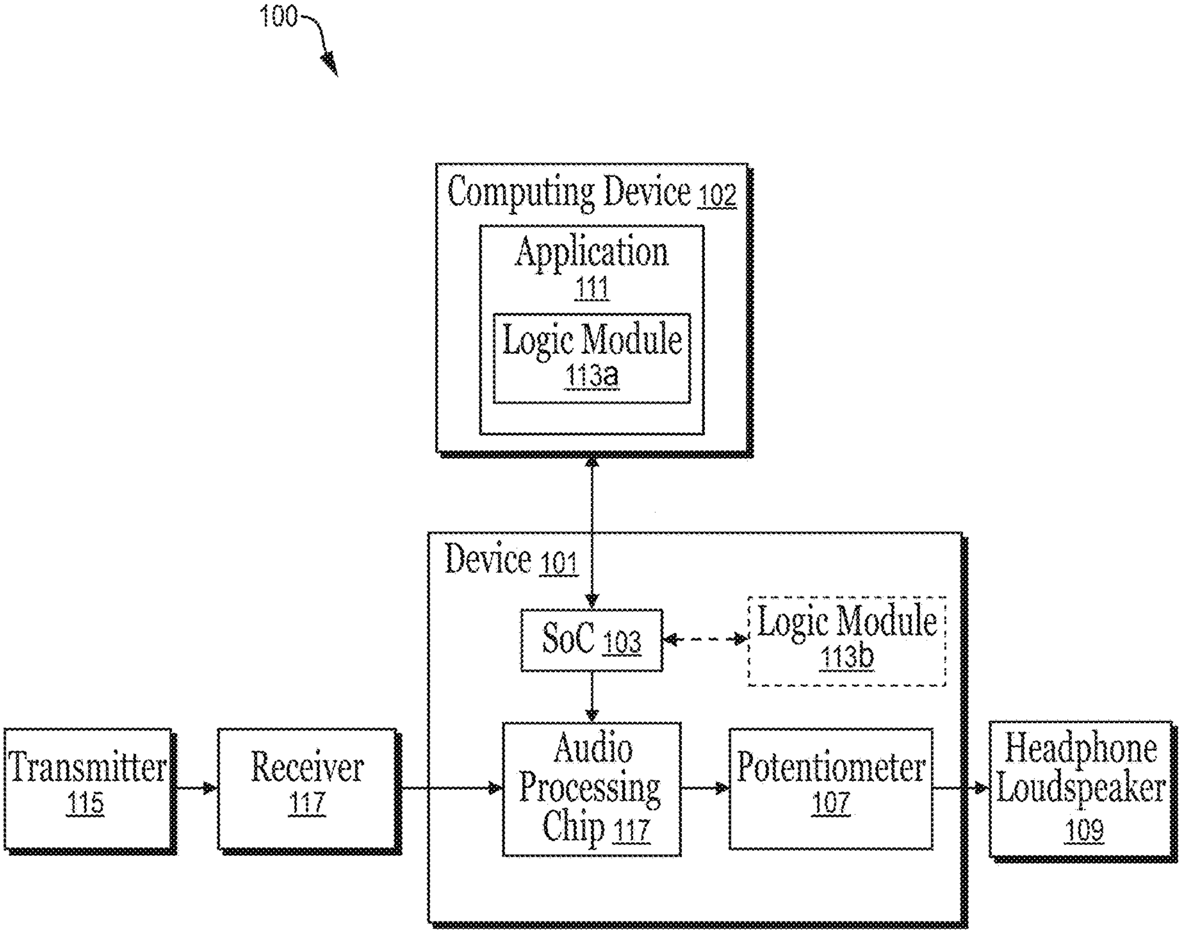
FIG. 1A is a block diagram depicting an embodiment of a system for individualized, location-based, time-corrected audio broadcasting and reception.

Referring now to FIG. 1A, a block diagram depicts an embodiment of a system 100 for individualized, location-based, time-corrected audio broadcasting and reception. The system 100 includes a device 101, a computing device 102, a system on a chip (SoC) 103, an audio processing chip 105, a potentiometer 107, a headphone loudspeaker 109, an application 111, a logic module 113, a transmitter 115, and a receiver 117.

The system 100 may include a source—which may also be referred to as an audio source or a point of origin. The source may include, by way of example, a performer of any kind (including a musical performer or public speaker) at an event, wherein events include, without limitation, a large gathering, a sporting event, or any number of events where a few sources of audio are broadcasting to many listeners.

The transmitter 115 may be located near or at the source (e.g., a stage, arena, field, or other source of audio) and between the source and the device 101. The transmitter 115 may be a wireless transmitter. The transmitter 115 may include or be in communication with a mixing console. The transmitter 115 may broadcast an audio signal generated by or at the source from the mixing console to the device 101. The transmitter 115 may be a transmitter that allows a single device to broadcast audio to multiple receivers simultaneously using a wireless communication protocol such as Bluetooth or Bluetooth Low Energy (LE); for example, the transmitter may be a transmitter including the Auracast feature owned by Bluetooth Special Interest Group of Kirkland, Washington. In some embodiments, the transmitter 115 may be an analog-to-digital converter.

In some embodiments, the transmitter 115 may transmit to the receiver 117 the sound generated at the source and also transmit additional content to the receiver 117 for playback to the user of the application 111. For example, the transmitter 115 may transmit curated content including, without limitation, venue information, artist updates, live updates for festivals, event schedule data, and so on.

Figure 1B:
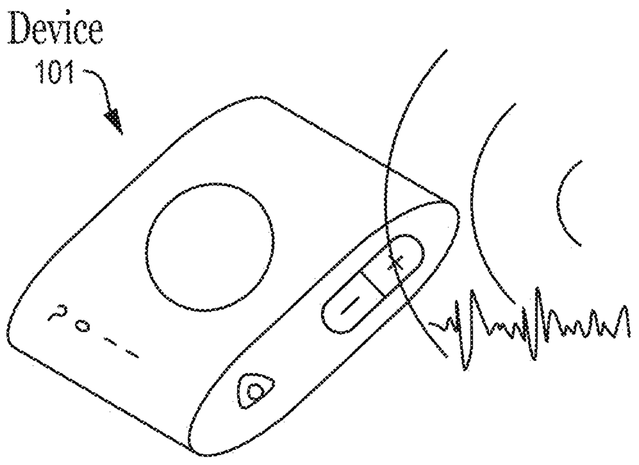
FIG. 1B is a block diagram depicting an embodiment of a system for individualized, location-based, time-corrected audio broadcasting and reception including a stand-alone device for modifying an audio signal.

Referring ahead to FIG. 1B, a block diagram depicts one embodiment of the device 101. As shown in FIG. 1B, the device 101 may be a stand-alone physical device. The device 101 may be a portable hardware object built to receive audio signals, adjust for timing and location, and drive playback by headphones or earbuds. The device 101 may include the SoC 103. The SoC 103 may be a chip that provides wireless connectivity through WiFi, Bluetooth, Zigbee, and Thread; for example, the SoC 103 may be an ESP32C6 chip.

The device 101 may include the audio processing chip 105. The audio processing chip 105 may combined analog and digital audio processing. In one embodiment, without limitation, the audio processing chip 105 may be a digital delay line chip, such as a Complementary Metal-Oxide-Semiconductor (CMOS) integrated circuit (IC), that creates audio delay effects, such as echo, reverb, and other effects; conventionally, such a chip may be used to create delayed time effects at the source of audio signal generation, but not to delay a broadcast by a period of time that corrects for the distance between a position of a user and the source of an audio signal. In another embodiment, an onboard processor of the computing device 102 provides the functionality of the audio processing chip 105.

The device 101 may include the potentiometer 107. The potentiometer 107 may be a digital potentiometer. The SoC 103 may manage the potentiometer 107.

The device 101 may be connected to or otherwise in communication with the headphone loudspeaker 1*o*9. The user can connect the headphone loudspeaker 1*o*9 (such as without limitation, phone-compatible headsets) to the personal computing device via Bluetooth. The audio output may be played back either via auxiliary or Bluetooth connection to the user's preferred headphone loudspeaker 109.

Figure 1C:
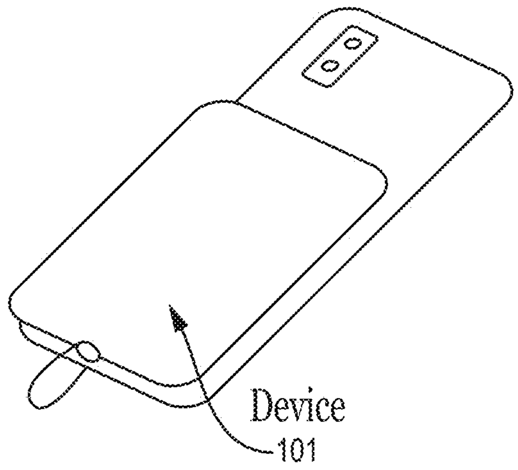
FIG. 1C is a block diagram depicting an embodiment of a system for individualized, location-based, time-corrected audio broadcasting and reception including a stand-alone device connected to a computing device.

Referring now to FIG. 1C, a physical device 101 executing the functionality described herein may be physically attached on the back of the computing device 102 via a magnet system and connected via cable connector to an input/output port.

Figure 1D:
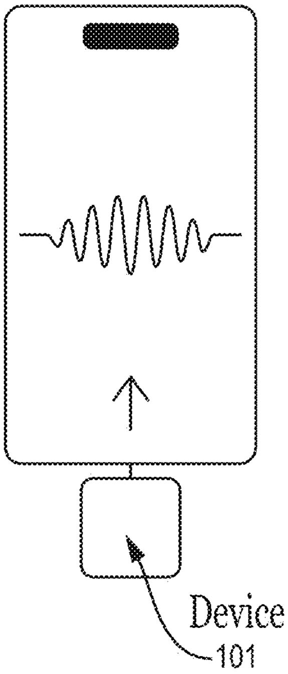
FIG. 1D is a block diagram depicting an embodiment of a system for individualized, location-based, time-corrected audio broadcasting and reception including a stand-alone device connected to a computing device.

Referring now to FIG. 1D, the physical device 101 may be directly connected to an input/output port of the computing device 102, instead of attaching via magnetic connections.

Referring back to FIG. 1A, the device 101 may include or be in communication with functionality for receiving audio directly or indirectly from the source; the receiver 117 may provide the functionality for receiving audio directly or indirectly from the source. The receiver 117 may receive an audio signal from the transmitter 115 and transmit the audio signal to the device 101. The receiver 117 may be, for example and without limitation, a LoRa/Bluetooth Auracast or radio receiver. The receiver 117 may receive an audio signal from a transmitter 115 connected to the source.

The receiver 117 may transmit the audio signal via a physical audio line-in to the device 101. The receiver 117 may transmit the audio signal via a physical audio line-in to the computing device 102 (e.g., via a cable connector). The application 111 executing on the phone may determine an amount of delay calculated using a GPS-based distance from the stage, as well as other factors. In some embodiments, the application 111 transmits the determined amount of delay to the device 101 for modification of the audio signal. In other embodiments, the application 111 manipulates the audio signal to add the determined amount of delay.

The device 101 may be referred to as an endpoint. The device 101 and the computing device 102 may jointly be referred to as the endpoint.

The device 101 may include an audio delay component. As described in further detail below in connection with FIG. 2A, audio delay may be accomplished in connection with the application 111 determining the location of the computing device 102 via GPS or via built in microphone. The audio delay component can adjust latency based on the information received from the application 111. In some embodiments, the user may further adjust latency via a physical element (e.g., adjustable with a knob) or digital user interface element that the user may use to adjust latency manually.

The system 100 includes the application 111, which executes on a personal computing device 102 (e.g., a smartphone, tablet, or other personal device). The application 111 may execute a logic module 113*a*.

The application 111 may determine a distance between the device 101 and the source. The application 111 may determine the distance between the endpoint and the nearest loudspeaker or a stage. The application 111 may, automatically or with a manual override by the user, synchronize an airborne sound generated at the source with the wireless sound received from the wireless transmitter, taking latencies, speed of airborne sound, listener location and other factors into account. Alternatively, the application 111 may instruct the device 101 to synchronize an airborne sound generated at the source with the wireless sound received from the wireless transmitter, taking latencies, speed of airborne sound, listener location and other factors into account.

Figure 1E:
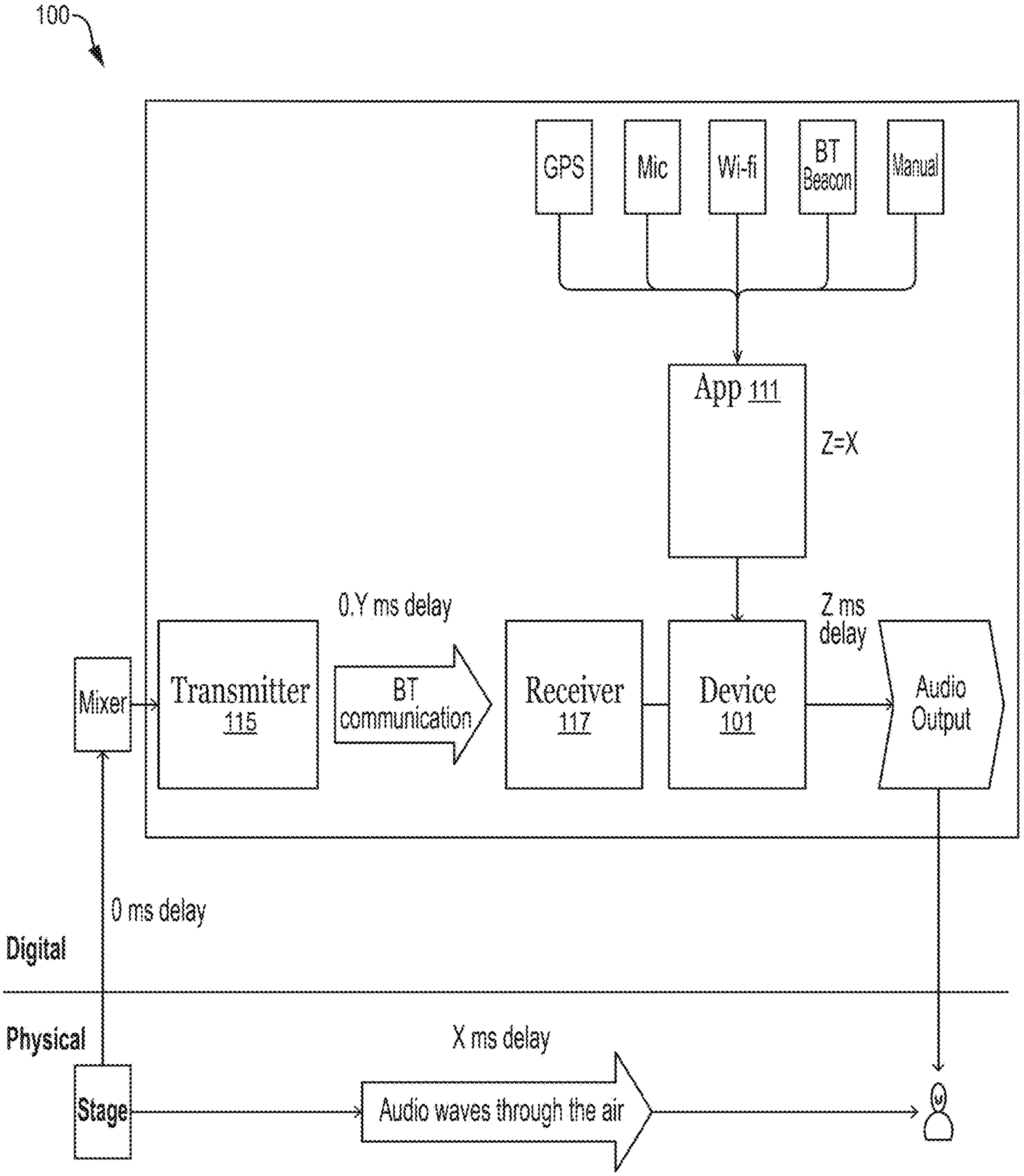
FIG. 1E is a block diagram depicting an embodiment of a system for individualized, location-based, time-corrected audio broadcasting and reception.

Referring now to FIG. 1E, a block diagram depicts an embodiment of the system 100. The application 111 may have access to functionality provided by the computing device 102 including a GPS component, a microphone, and a WiFi connection. The application 111 may have access to functionality provided by the computing device 102 including a Bluetooth Beacon. The application 111 may provide a user interface with which a user may manually enter location data. As shown in FIG. 1E, audio waves broadcast from the stage may be said to have a delay of x ms in reaching the user (e.g., the user will hear the sound that left the stage at time zero, x milliseconds after time zero). Audio waves broadcast from the stage, received by a mixer in communication with a transmitter 115 and sent to a receiver 117 may have a delay of y ms in reaching the device 101 of the user. The application 111 may determine the location of the user and use the determined location to identify the value of x ms. The device 101 may receive the determined delay of x ms. The device 101 may add a delay of x ms before directing the broadcast of the audio received by the receiver 117 to the headphone loudspeaker 109. In some embodiments, the device 101 may add a delay of x ms plus a delay of y ms to correct for the delay introduced by transmitting the audio from the mixer to the transmitter 115 to the receiver 117.

Figure 1F:
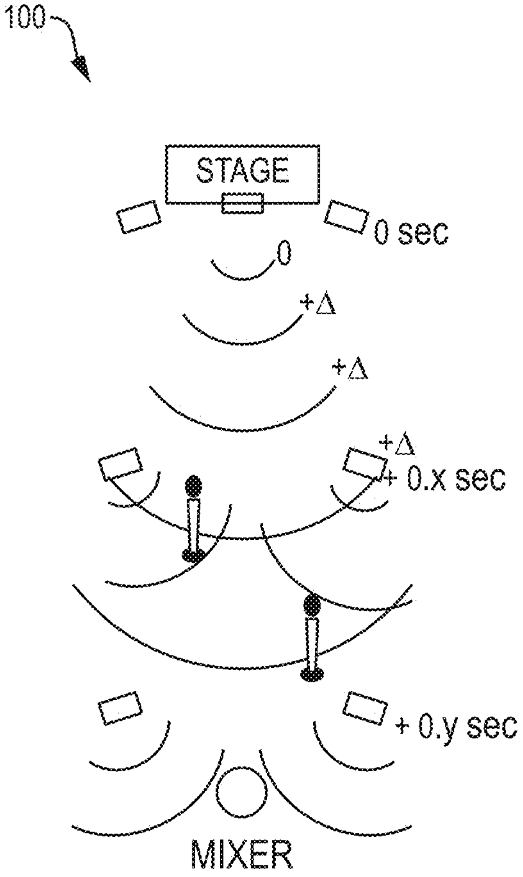
FIG. 1F is a block diagram depicting an embodiment of a system for individualized, location-based, time-corrected audio broadcasting and reception.

Referring now to FIG. 1F, a block diagram depicts an embodiment of the system implemented at a live concert scenario, where the audience listens to the sound that is coming from loudspeakers from the stage and at one or more physical locations surrounding the audience. Loudspeakers may be time adjusted to allow synchronization between the farthest origin (the stage, for instance) and the closest audio origin (e.g., the loudspeaker that is closest to the user).

Figure 1G:
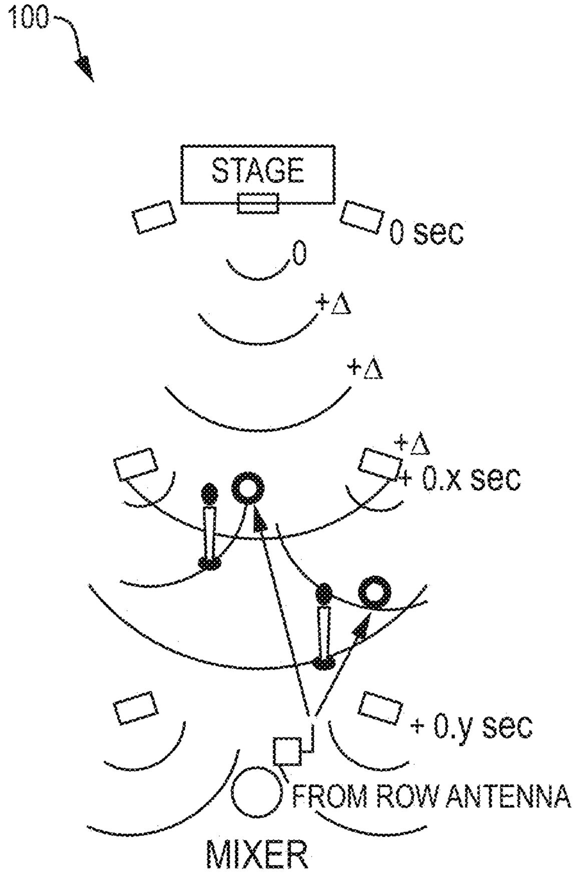
FIG. 1G is a block diagram depicting an embodiment of the system individualized, location-based, time-corrected audio broadcasting and reception.

Referring now to FIG. 1G, a block diagram depicts an embodiment of the system 100 in which the endpoint executes the application, allowing an endpoint user to listen to the audio coming from the mixer (that is, high quality audio) transmitted to the endpoint user with a time adjustment resulting in the physical sound coming from the loudspeakers being synchronized with the audio in a headset or other listening device of the user of the device 101.

Figure 1H:
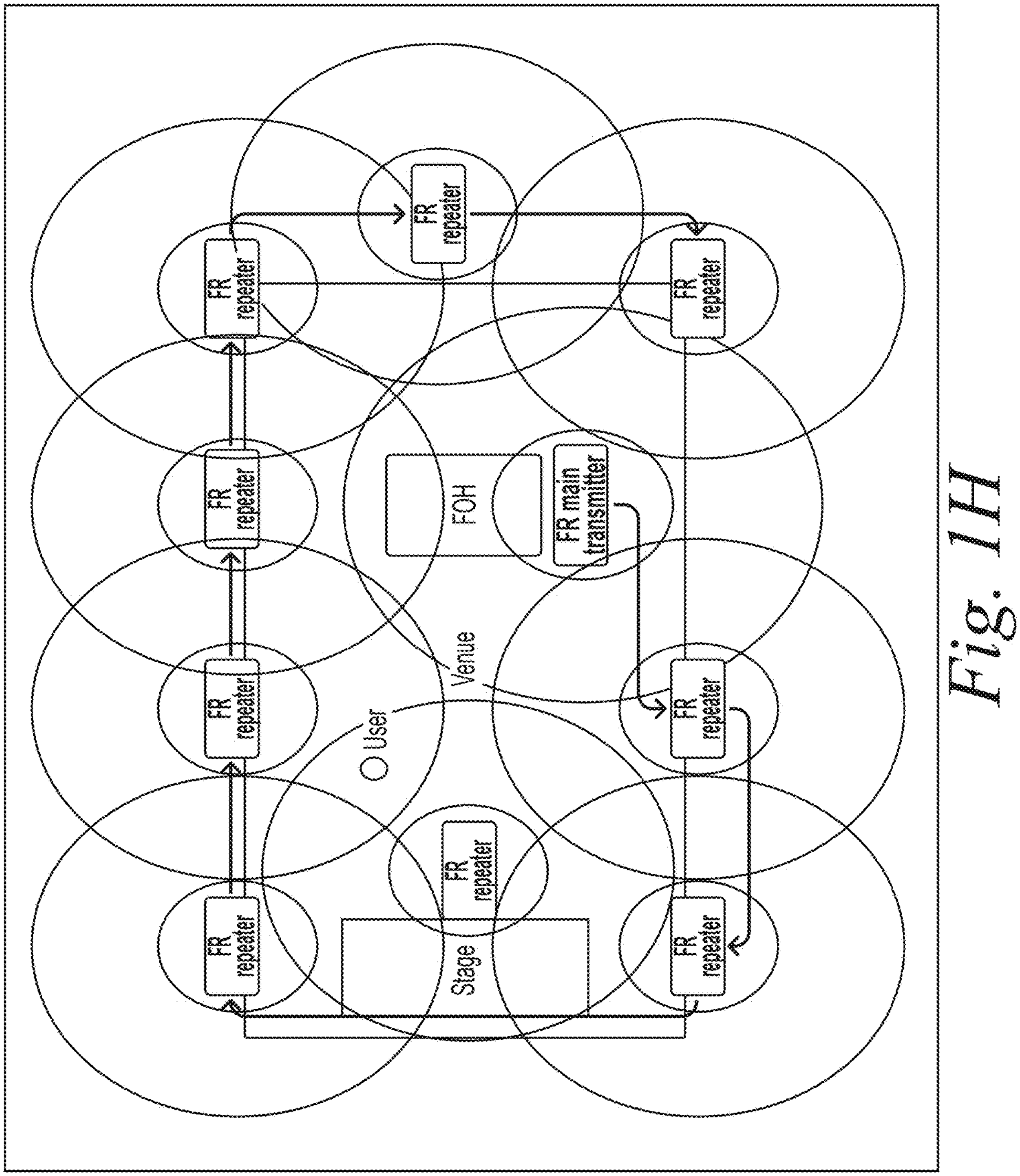
FIG. 1H is a block diagram depicting an embodiment of the system individualized, location-based, time-corrected audio broadcasting and reception.

Referring now to FIG. 1H, a block diagram depicts an embodiment of the system 100 in which the system 100 includes a plurality of transmitters 115. In one of these embodiments, the system 100 includes a plurality of repeaters, which may stream independently or may daisy chain to each other via analog audio connections. Privacy and security of the broadcasted audio may be managed by the system 100 at the discretion of a content owner.

Figure 1I:
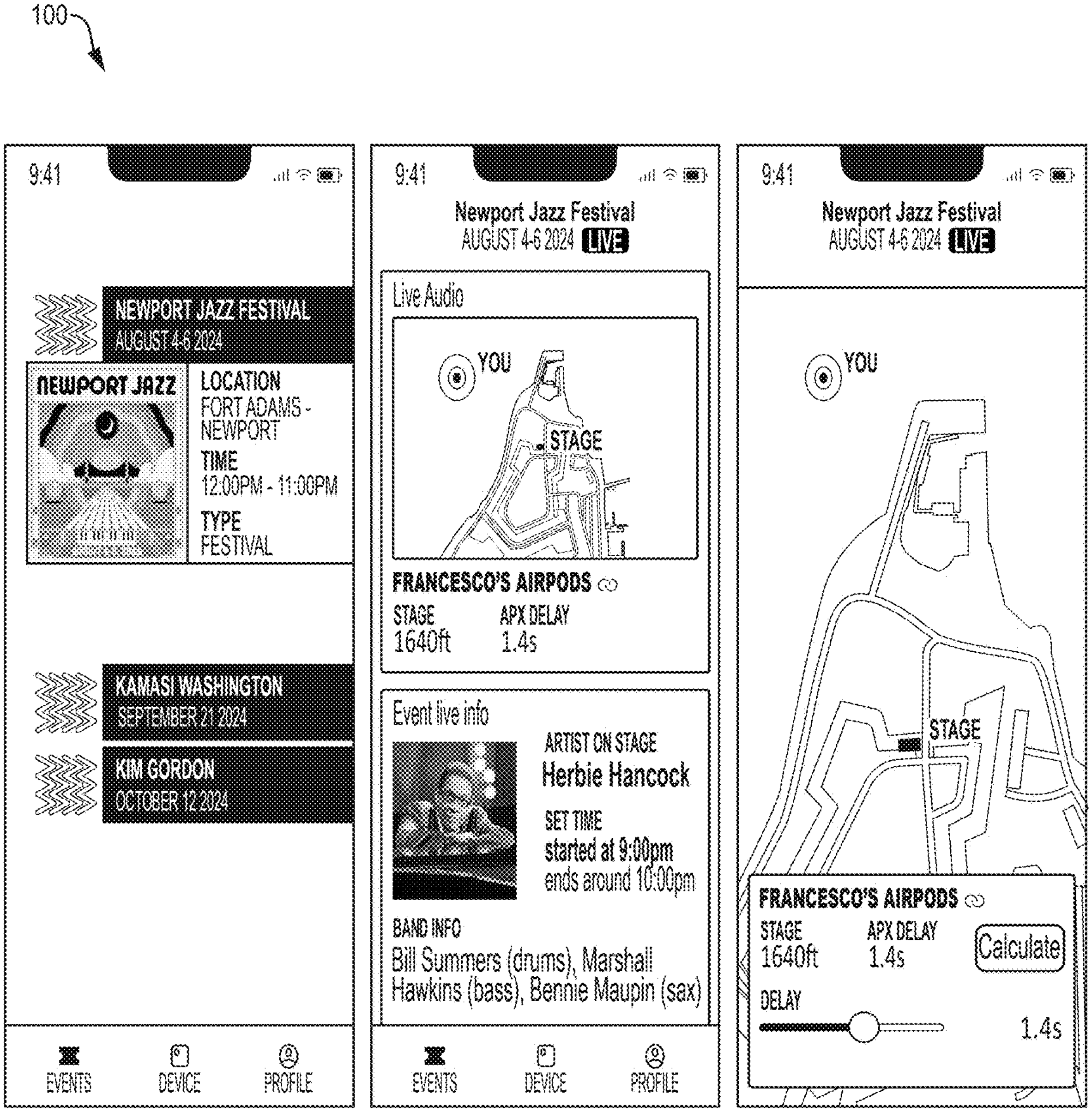
FIG. 1I is a block diagram depicting an embodiment of the system individualized, location-based, time-corrected audio broadcasting and reception and including at least one user interfaces for display.

Referring now to FIG. 1I, a block diagram depicts a plurality of user interfaces displayed by the application 111. In addition to an audio communication framework, the methods and systems described herein may execute functionality to further augment live events experiences by displaying data associated with the audio in at least one user interface. For example, in addition to providing enhanced audio, and as depicted in FIG. 1I, the application 111 may generate and display information about the source, such as, without limitation, information about the artist/band on stage and schedule.

As depicted above, the system 100 includes the device 101 and the application 111 and the headphone loudspeaker 109. As described above, the device 101 is physically connected to the computing device 102 and communicates with the application 111 to execute the functionality described herein. In some embodiments, however, the headphone loudspeaker 109 includes the components and functionality of the device 101 and the system 100 does not provide a separate device 101. As indicated above, an onboard processor of the computing device 102 may provide the functionality of the audio processing chip 105. In other embodiments, the software and hardware components of the computing device 102—including the onboard processing chip—may provide the functionality of each of the components in the device 101.

Figure 1J:
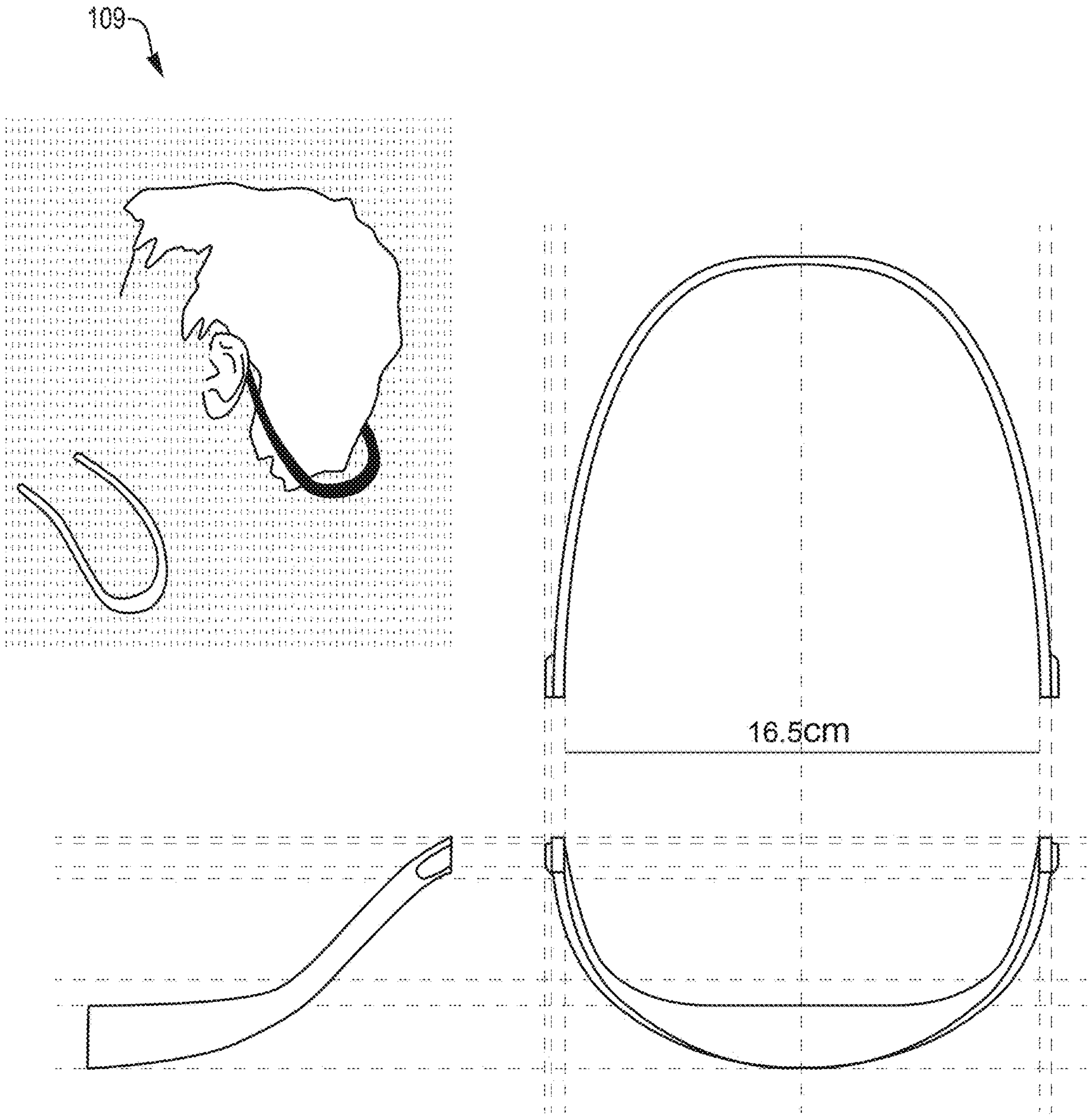
FIG. 1J is a block diagram depicting an embodiment of the system individualized, location-based, time-corrected audio broadcasting and reception.

Referring now to FIG. 1J, a block diagram depicts an embodiment of a headphone loudspeaker 109 provided as a pair of glasses, such as glasses equipped with bone-conduction or other transducers. The headphone loudspeaker 109 may be in communication with the computing device 102, directly or indirectly. In some embodiments, the headphone loudspeaker 109 may provide the functionality of the device 101. As depicted in FIG. 1J, an optional rear component of the headphone loudspeaker 109 may include the functionality of the device 101.

In other embodiments, the device 101 includes the functionality of the application 111. In one of these embodiments, the system 100 includes the device 101 and the headphone loudspeaker 109 but not a separate application 111.

In still other embodiments, the computing device 102 is a device 102 that has integrated broadcasting functionality (e.g., an "Auracast-enabled" smartphone) and transmits the modified audio signal to the headphone loudspeaker 109 for playback.

The methods and systems described herein provide functionality for executing a method for using an individualized endpoint location of a listener to determine a distance from a source of an audio signal and modify the audio signal to include a delay, the application 111 providing improved technology that enhances an audio signal through the combination of the use of the individualized endpoint location and the delay-related modification.

Figure 2A:
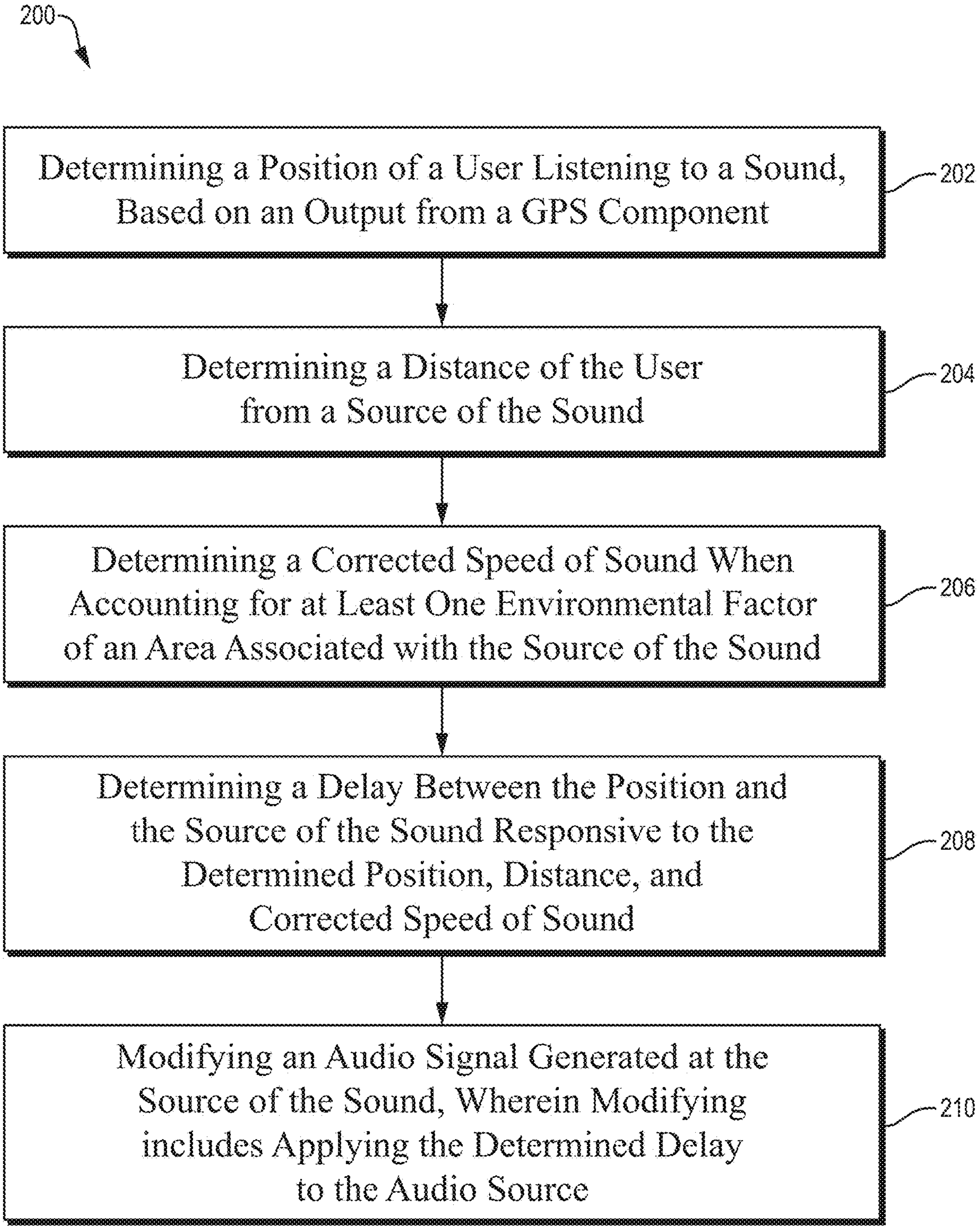
FIG. 2A is a flow diagram depicting an embodiment of a method for individualized, location-based, time-corrected audio broadcasting and reception.

Referring now to FIG. 2A, in brief overview, a flow diagram depicts one embodiment of a method 200 for using an individualized endpoint location of a user to modify an audio signal. The method 200 includes determining a position of a user listening to a sound, based on an output from a GPS component (202). The method 200 includes determining a distance of the user from a source of the sound (204). The method 200 includes determining a corrected speed of sound when accounting for at least one environmental factor of an area associated with the source of the sound (206). The method 200 includes determining a delay between the position and the source of the sound responsive to the determined position, distance, and corrected speed of sound (208). The method 200 includes modifying an audio signal generated at the source of the sound, wherein modifying includes applying the determined delay to the audio signal (210).

The application 111 may determine the position of the user at a time subsequent to a time when the transmitter 115 begins transmitting the sound to the receiver 115. In some embodiments, prior to the time when the transmitter 115 begins transmitting the sound to the receiver 115, the application 111 transmits, to the transmitter 115, a credential authorizing the user to receive playback of the sound; the credential may be referred to as an audio stream credential. The application 111 may store one or more audio stream credentials in a database.

In some embodiments, the system 100 for using an individualized endpoint location of a user to modify an audio signal includes a processor on a client computing device including a GPS component, the processor comprising means for determining a position of a user listening to a sound, means for determining a distance of the user from a source of the sound, means for determining a corrected speed of sound when accounting for at least one environmental factor of an area associated with the source of the sound, and means for determining a delay between the position and the source of the sound responsive to the determined position, distance, and corrected speed of sound; and a device in communication with the computing device, the device comprising a digital potentiometer and an audio processing chip, the device (i) receiving, from the application, the determined delay and (ii) modifying an audio signal generated at the source of the sound, wherein modifying includes applying the determined delay to the audio signal.

Referring now to FIG. 2A, in greater detail and in connection with FIGS. 1A-1G, the method 200 includes determining a position of a user listening to a sound, based on an output from a GPS component (202). The application 111 may determine the position of the user. The application 111 may receive at least one set of map coordinates from the GPS component. The application 111 may use the received at least one set of map coordinates to determine the position of the user.

In some embodiments, the system includes functionality for executing a plurality of methods for determining a user location. For example, the method 200 may include determining that the GPS component is unavailable (which may include determining that the GPS component is not functioning) and the method 200 may then include executing an indoor localization technique to determine the position of the user. As one example, the user location functionality may use indoor localization technologies such as WiFi WPS (WiFi Positioning System). Continuing with this example, if the device 101 is connected to a WiFi network provided by a venue at which the user is located, the application 111 may estimate the distance from the source using WiFi WPS. As another example, the system may use Bluetooth Beacon technology to estimate the proximity to a transceiver; for example, the system 100 may estimate the proximity of the computing device 102 to a Bluetooth Beacon and use the location of the Bluetooth Beacon to determine the distance of the computing device 102 to the source of the sound. Continuing with this example, a plurality of Bluetooth Beacon devices may each provide their locations to the system 100 and the system 100 may then triangulate the location of the computing device 102 based on the distance of the computing device 102 to each of the plurality of Bluetooth Beacon devices. As still another example, the system 100 may use Bluetooth LE channel sounding to estimate proximity to a transceiver. As a further example, there may be Ultra High Frequency Radio Frequency Identification (UHF RFID) signals and/or Ultra-Wideband (UWB) signals that the application 111 may use to locate a position of the user. The method 200 may therefore include attempting a first position localization method based on the output from the GPS component, determining that an accuracy level associated with an output of the first position localization method does not meet a threshold level of accuracy; identifying a second position localization method to apply; determining that an accuracy level associated with an output of the second position localization method meets a threshold level of accuracy; and determining the position of the user using the second position localization method.

The method 200 includes determining a distance of the user from a source of the sound (204). The application 111 may determine the distance of the user from the source of the sound. The application 111 may use a set of coordinates identifying a location of the source of the sound (such as a stage) to determine the distance between the position of the user and the location of the source of the sound.

The method 200 includes determining a corrected speed of sound when accounting for at least one environmental factor of an area associated with the source of the sound (206). The application 111 may determine the corrected speed of sound. The application 111 may receive a current temperature; for example, the application 111 may query the computing device 102 for the current temperature. The application 111 may calculate a modification to the speed of sound based on the received current temperature. The application 111 may receive a current wind speed and calculate a modification to the speed of sound based on the received current wind speed. In some embodiments, the application 111 determines a corrected speed of sound accounting for a delay introduced by transmitting the audio signal from the source of the source to the receiver.

The method 200 includes determining a delay between the position and the source of the sound responsive to the determined position, distance, and corrected speed of sound (208). The method 200 may include determining the delay in milliseconds. The method 200 may include determining the delay in seconds. The application 111 may determine the delay. The application 111 may use acoustic positioning to calculate Time Difference of Arrival (TDOA). This method may include capturing an audio signal from two different sources, where the audio signal may be captured via radio broadcast or digital audio stream and where the ambient sound may be captured by a microphone. A unique frequency pattern may be present in both sources so that the application 111 may calculate the time difference and determine the distance between the two sources.

The application 111 may repeat the process of determining the delay. For example, the application 111 may continually execute the steps described above to determine the delay, updating the delay if the user position changes from one execution of the steps described above to another.

The method 200 may include transmitting, by a computing device, to a device comprising a digital potentiometer and an audio processing chip, the determined delay.

The method 200 includes modifying an audio signal generated at the source of the sound, wherein modifying includes applying the determined delay to the audio signal (210). The application 111 may modify the audio signal. The device 101 may modify the audio signal. The digital potentiometer 107 may apply the determined delay to modify the audio signal.

The method 200 may include transmitting, by the device 101, the modified audio signal to a loudspeaker such as the headphone loudspeaker 109, for playback.

Figure 2B:
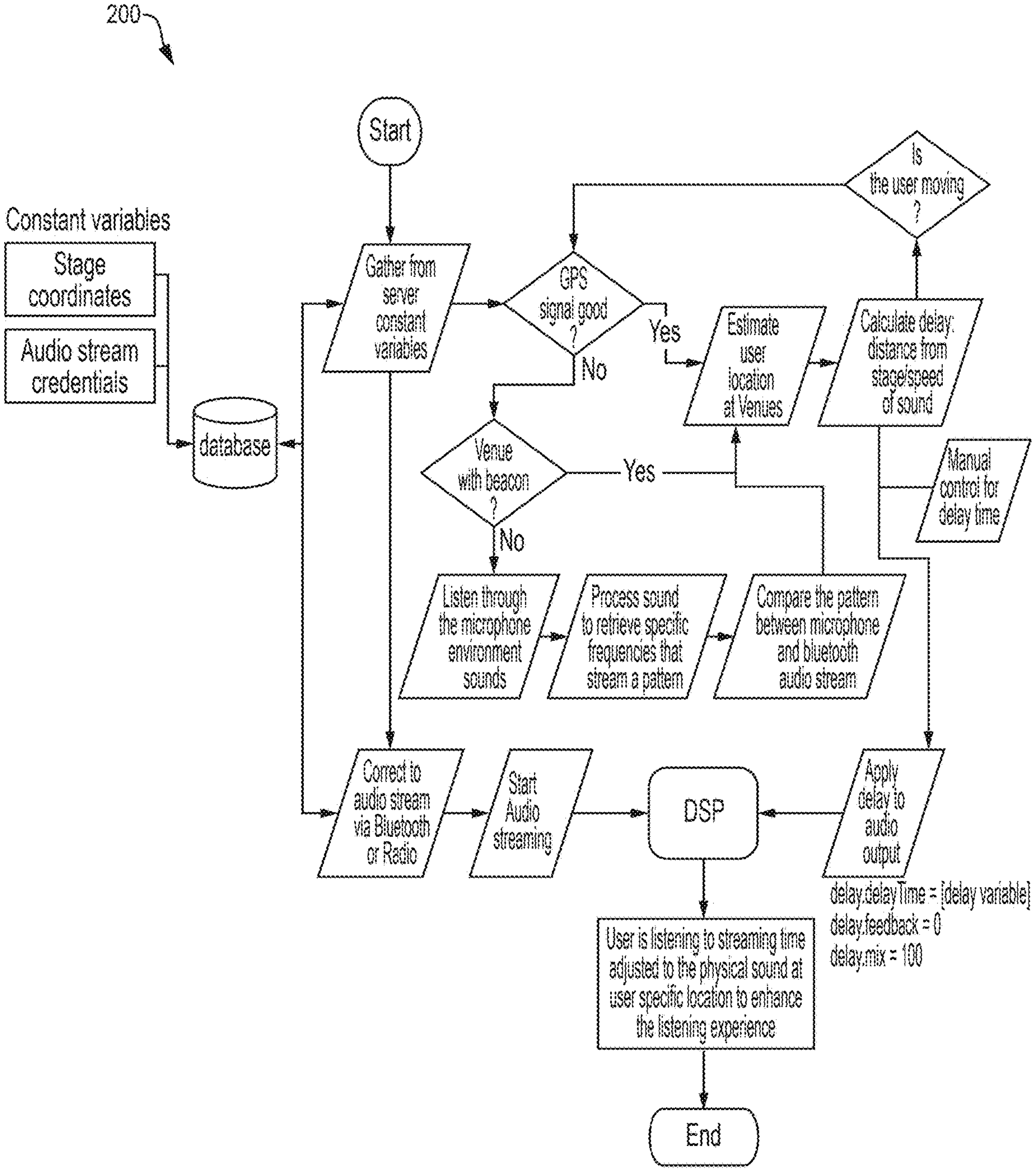
FIG. 2B is a flow diagram depicting an embodiment of a method for individualized, location-based, time-corrected audio broadcasting and reception.

Referring now to FIG. 2B, a flow diagram depicts an embodiment of the method 200. As depicted in FIG. 2B, the application 111 may gather, from a server (not shown) one or more variables needed to determine the delay. The application 111 may determine whether the GPS signal is usable for determining user position and, if so, may calculate the delay; if not, the application 111 may execute an alternative position localization method. In some embodiments, if the venue including the source of the sound has provided a Bluetooth beacon, the application 111 may use data associated with the Bluetooth beacon to estimate the user location. If the venue including the source of the sound has not provided a Bluetooth beacon, the application 111 may use a microphone of the computing device 102 to record a sound from the environment of the computing device 102 and process the sound to retrieve specific frequencies that stream a pattern and compare the pattern between the microphone and the sound (e.g., the audio stream) to estimate the user position. As shown in FIG. 2B, in some embodiments, the user may manually control the delay time, overriding or modifying the determined day. The application 111 may initiate an audio streaming process through which the audio processing chip 105 (referred to as digital signal processor in FIG. 2B) receives the audio and applies the determined delay to the audio and streams the modified audio to the headphone loudspeaker 109.

Figure 3:
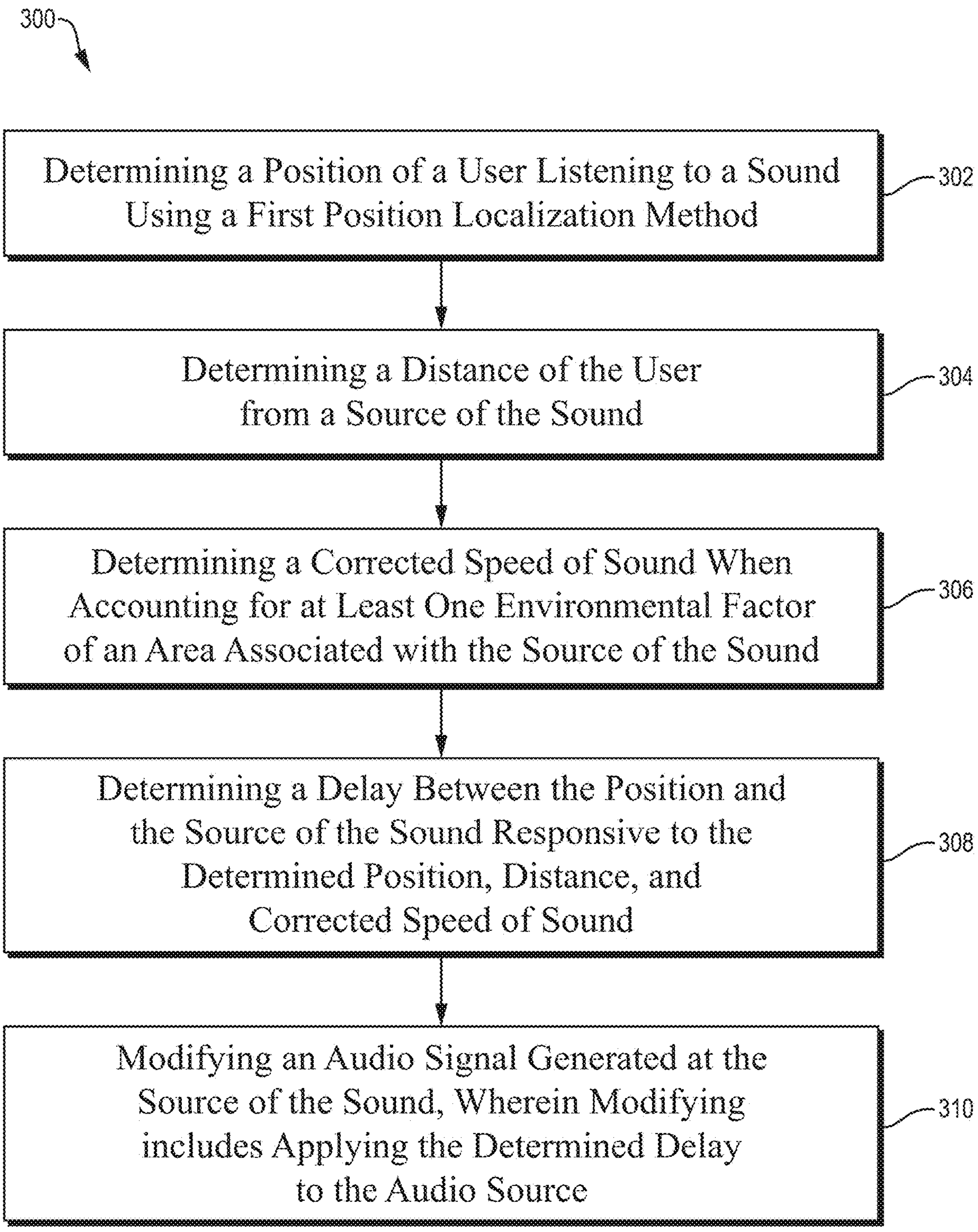
FIG. 3 is a flow diagram depicting an embodiment of a method for individualized, location-based, time-corrected audio broadcasting and reception.

Although the method 200 is described above as using a GPS component to determine a location of the user, in other embodiments, the method may execute using different localization techniques. Referring now to FIG. 3, therefore, the method 300 includes determining a position of a user listening to a sound using a first position localization method (302). As indicated above, localization methods may include, without limitation, WiFi WPS (WiFi Positioning System), Bluetooth Beacon technology, Bluetooth LE channel sounding, UHF RFID signals and UWB signals. Visual and/or optical localization methods may be used in addition to or instead of electronic methods. The method 300 includes determining a distance of the user from a source of the sound (304). The method 300 includes determining a corrected speed of sound when accounting for at least one environmental factor of an area associated with the source of the sound (306). The method 300 includes determining a delay between the position and the source of the sound responsive to the determined position, distance, and corrected speed of sound (308). The method 300 includes modifying an audio signal generated at the source of the sound, wherein modifying includes applying the determined delay to the audio signal (310).

Therefore, in some embodiments, implementing the methods and systems described herein may provide a system that auto-locates a listener within a physical space, continuously in real time, and adjusts the sound the listener hears electronically with the sound the listener hears acoustically.

In some embodiments, the system 100 includes non-transitory, computer-readable medium comprising computer program instructions tangibly stored on the non-transitory computer-readable medium, wherein the instructions are executable by at least one processor to perform the methods described above in connection with FIGS. 2A-2B and 3.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, SCALA, PYTHON, TYPESCRIPT, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
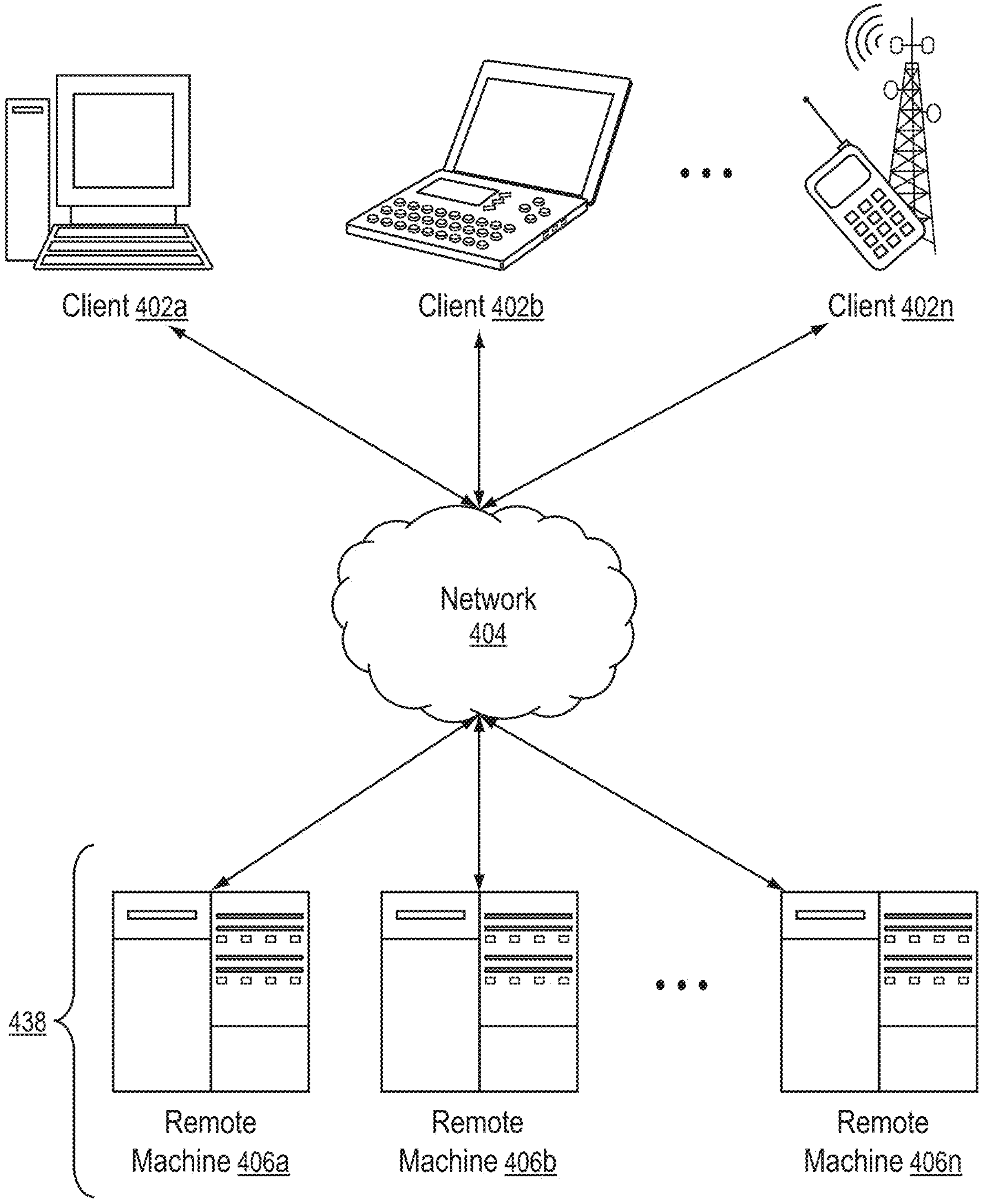
FIGS. 4A-4C are block diagrams depicting embodiments of computers useful in connection with the methods and systems described herein.
Figure 4B:
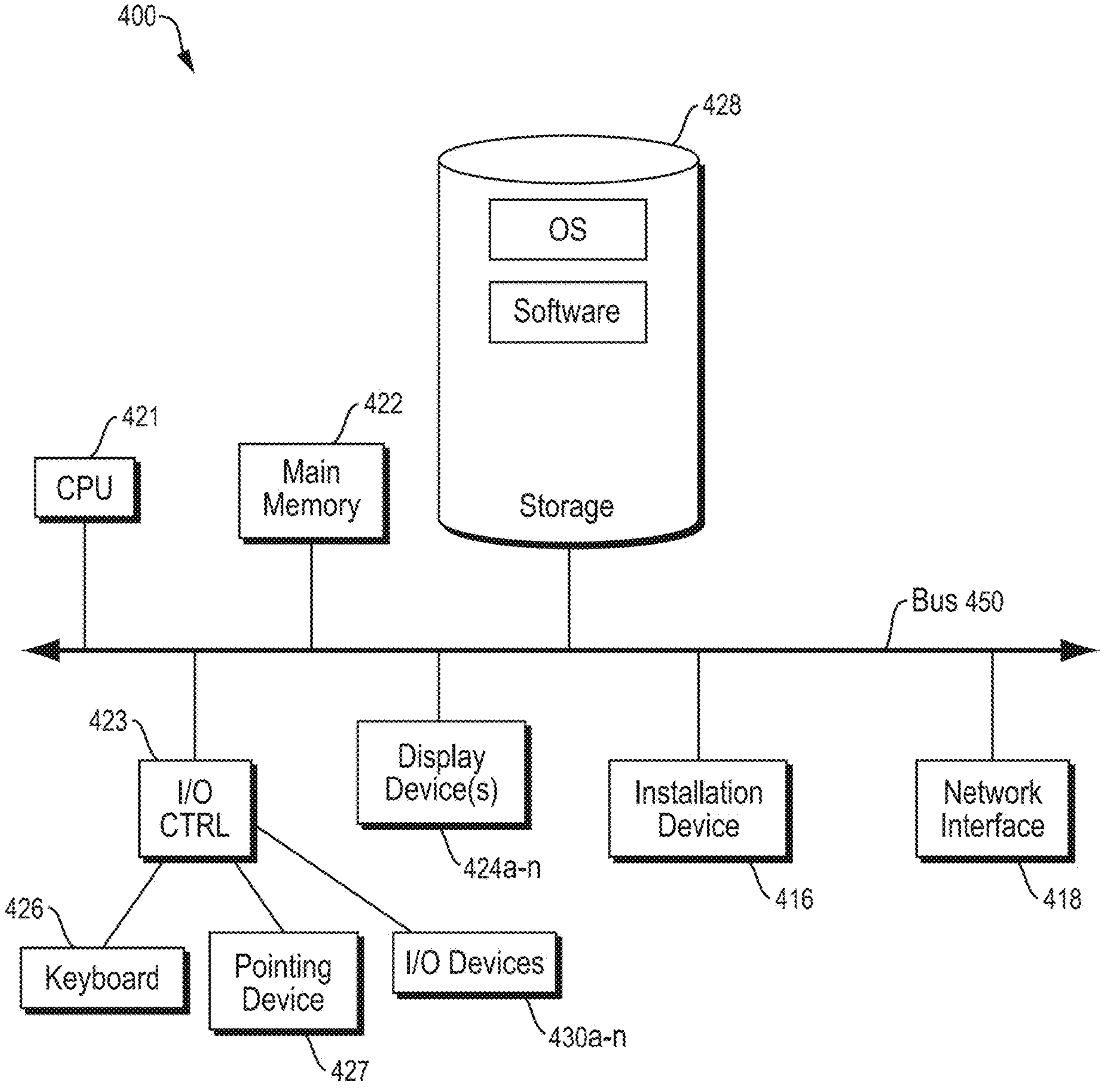
Figure 4C:
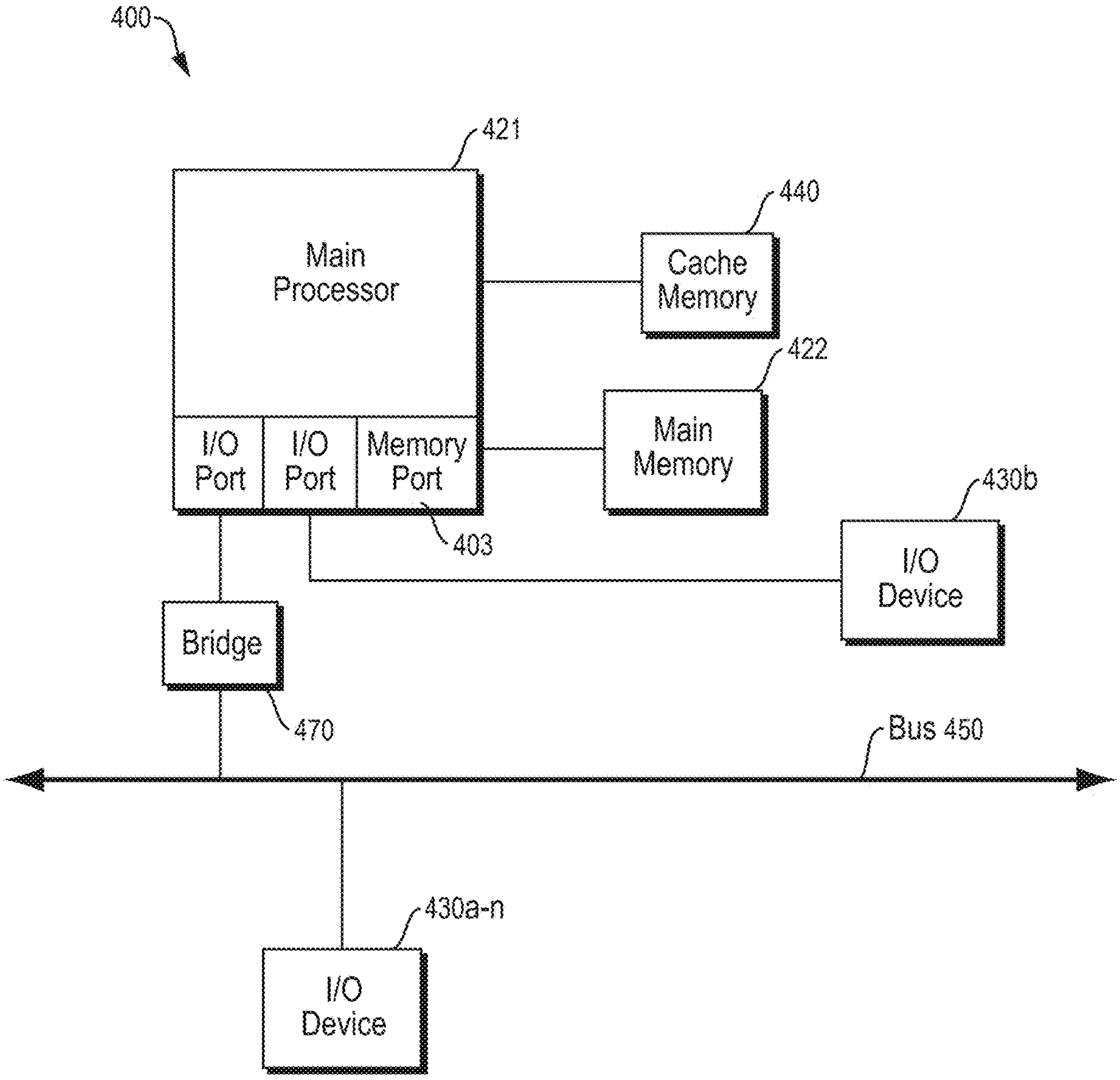

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402*a*-402*n* (also generally referred to as local machine(s) 402, client(s) 402, client node(s) 402, client machine(s) 402, client computer(s) 402, client device(s) 402, computing device(s) 402, endpoint(s) 402, or endpoint node(s) 402) in communication with one or more remote machines 406*a*-406*n* (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 304 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network 404 may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, or any other type and/or form of executable instructions capable of executing on client 402.

In one embodiment, a computing device 406 provides functionality of a web server. The web server may be any type of web server, including web servers that are open-source web servers, web servers that execute proprietary software, and cloud-based web servers where a third party hosts the hardware executing the functionality of the web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the APACHE HTTP SERVER, developed and maintained by the Apache Software Foundation of Forest Hill, MD, the NGINX and NGINX Plus products provided by F5 Networks of Seattle, WA, and any other type of web server.

In some embodiments, the system may include multiple, logically-grouped remote machines 406. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 402 or a remote machine 406. As shown in FIGS. 4B and 4C, each computing device 400 includes a central processing unit 321, and a main memory unit 422. As shown in FIG. 4B, a computing device 400 may include a storage device 428, an installation device 416, a network interface 418, an I/O controller 423, display devices 424*a-n*, a keyboard 426, a pointing device 427, such as a mouse, and one or more other I/O devices 430*a-n*. The storage device 428 may include, without limitation, an operating system and software. As shown in FIG. 4C, each computing device 400 may also include additional optional elements, such as a memory port 403, a bridge 470, one or more input/output devices 430*a-n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 340 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430*b* via, for example, HYPERTRANSPORT, RAPIDIO, or INFINIBAND communications technology.

One or more of a wide variety of I/O devices 430*a-n* may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, CA.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 95, WINDOWS 98, WINDOWS 2000, WINDOWS NT, WINDOWS CE, WINDOWS XP, WINDOWS 7 through 11, and WINDOWS VISTA, all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; or any type and/or form of a Unix operating system, among others.

Having described certain embodiments of methods and systems for individualized, location-based, time-corrected audio broadcasting and reception, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for using an individualized endpoint location of a user to modify an audio signal, the method including:

determining, by a computing device associated with the user, a position of a user listening to a sound, based on an output from a GPS component;

determining, by the computing device, a distance of the user from a source of the sound;

determining, by the computing device, a corrected speed of sound when accounting for at least one environmental factor of an area associated with the source of the sound;

determining, by the computing device, a delay between the position and the source of the sound responsive to the determined position, distance, and corrected speed of sound;

transmitting, by the computing device, to a device comprising a digital potentiometer and an audio processing chip, the determined delay; and modifying, by the device, an audio signal generated at the source of the sound, wherein modifying includes applying the determined delay to the audio signal.

2. The method of claim 1 further comprises transmitting, by the device, to a loudspeaker, the modified audio signal for playback.

3. The method of claim 1 further comprising:

determining, by the computing device, that the GPS component is unavailable; and executing, by the computing device, an indoor localization technique to determine the position of the user.

4. The method of claim 1 further comprising:

attempting, by the computing device, a first position localization method based on the output from the GPS component;

determining, by the computing device, that an accuracy level associated with an output of the first position localization method does not meet a threshold level of accuracy;

identifying, by the computing device, a second position localization method to apply;

determining, by the computing device, that an accuracy level associated with an output of the second position localization method meets a threshold level of accuracy; and determining, by the computing device, the position of the user using the second position localization method.

5. The method of claim 1 further comprising transmitting, by the computing device, to a transmitter of the sound, a credential authorizing the user to receive playback of the modified audio signal.

6. A system for using an individualized endpoint location of a user to modify an audio signal comprising:

an application executing on a client computing device including a GPS component, the application further comprising:

means for determining a position of a user listening to a sound, based on an output from the GPS component, means for determining a distance of the user from a source of the sound, means for determining a corrected speed of sound when accounting for at least one environmental factor of an area associated with the source of the sound, and means for determining a delay between the position and the source of the sound responsive to the determined position, distance, and corrected speed of sound; and a device comprising a digital potentiometer and an audio processing chip, the device (i) receiving, from the application, the determined delay and (ii) modifying an audio signal generated at the source of the sound, wherein modifying includes applying the determined delay to the audio signal.

7. The system of claim 6, wherein the device further comprises a connection to a loudspeaker.

8. The system of claim 7, wherein the loudspeaker plays the modified audio signal.

9. The system of claim 6, wherein the application further comprises means for transmitting, to the device, the determined delay.

10. The system of claim 6, wherein the device further comprises means for transmitting, to a loudspeaker, the modified audio signal for playback.

11. The system of claim 6, wherein the application further comprises:

means for determining that the GPS component is unavailable; and means for executing an indoor localization technique to determine the position of the user.

12. The system of claim 6, wherein the application further comprises:

means for attempting a first position localization method based on the output from the GPS component;

means for determining that an accuracy level associated with an output of the first position localization method does not meet a threshold level of accuracy;

means for identifying a second position localization method to apply;

means for determining that an accuracy level associated with an output of the second position localization method meets a threshold level of accuracy; and means for determining the position of the user using the second position localization method.

13. The system of claim 6, wherein the application further comprises means for transmitting, to a transmitter of the sound, a credential authorizing the user to receive playback of the modified audio signal.

14. A method for using an individualized endpoint location of a user to modify an audio signal, the method including:

determining, by a computing device associated with the user, a position of a user listening to a sound using a first position localization method;

determining, by the computing device, a distance of the user from a source of the sound;

determining, by the computing device, a corrected speed of sound when accounting for at least one environmental factor of an area associated with the source of the sound;

determining, by the computing device, a delay between the position and the source of the sound, responsive to the determined position, distance, and corrected speed of sound;

transmitting, by the computing device, to a device comprising a digital potentiometer and an audio processing chip, the determined delay; and modifying, by the device, an audio signal generated at the source of the sound, wherein modifying includes applying the determined delay to the audio signal.

15. The method of claim 14 further comprising:

determining, by the computing device, that an accuracy level associated with an output of the first position localization method does not meet a threshold level of accuracy;

identifying, by the computing device, a second position localization method to apply;

determining, by the computing device, that an accuracy level associated with an output of the second position localization method meets a threshold level of accuracy; and determining, by the computing device, the position of the user using the second position localization method.

16. The method of claim 15 further comprises transmitting, by the device, to a loudspeaker, the modified audio signal for playback.

17. The method of claim 15 further comprising transmitting, by the computing device, to a transmitter of the sound, a credential authorizing the user to receive playback of the modified audio signal.

18. The method of claim 14 further comprising executing, by the computing device, an indoor localization technique to determine the position of the user.

* * * * *